(12) United States Patent
Hatchell

(10) Patent No.: US 7,159,956 B1
(45) Date of Patent: Jan. 9, 2007

(54) DISC CASE HOLDING APPARATUS

(76) Inventor: Sheila A. Hatchell, 35 Twin Oaks Dr., Hampton, VA (US) 23666

( * ) Notice: Subject to any disclaimer, the term of this patent is extended or adjusted under 35 U.S.C. 154(b) by 322 days.

(21) Appl. No.: 10/769,235

(22) Filed: Feb. 2, 2004

(51) Int. Cl.
*A47F 3/10* (2006.01)
*A47G 19/08* (2006.01)
*B65D 85/57* (2006.01)

(52) U.S. Cl. .................. 312/9.45; 312/125; 211/41.12; 206/308.1

(58) Field of Classification Search ............ 206/307.1, 206/308.1, 309, 311, 312, 287.14, 287.15; 211/40, 41.12, 78, 163; 312/9.45, 9.46, 125, 312/135
See application file for complete search history.

(56) References Cited

U.S. PATENT DOCUMENTS

| | | | |
|---|---|---|---|
| 5,150,354 A * | 9/1992 | Iwata et al. ................. 720/735 | |
| 5,176,264 A | 1/1993 | De Palma | |
| 5,197,600 A | 3/1993 | Garcia | |
| 5,307,926 A | 5/1994 | Mee | |
| D365,489 S | 12/1995 | Barley | |
| 5,669,494 A | 9/1997 | Geffen | |
| D385,744 S | 11/1997 | Boothe | |
| 5,695,219 A | 12/1997 | Crawford | |
| 5,715,937 A | 2/1998 | Oshry et al. | |
| 5,915,549 A * | 6/1999 | Palmer et al. ........... 206/308.1 |
| 6,464,088 B1 * | 10/2002 | Caplan et al. ................. 211/40 |

* cited by examiner

*Primary Examiner*—David T. Fidei

(57) ABSTRACT

A disc case holding apparatus includes a plurality of housings. Each of the housings has a bottom wall and a peripheral wall that is attached to and extends upwardly away from the bottom wall such that a pair of lateral sides, a front side and a back side are defined. An upper edge of the peripheral wall defines an opening extending into the housing. Each of a plurality of securing members is attached to one of the housings for selectively extending over the opening and securing a disc case within the housing. A base has an outer surface. A plurality of couplers is mounted on the base. Each of the couplers is attached to one of the bottom walls such that each of the bottom walls is pivotally attached to the base.

15 Claims, 4 Drawing Sheets

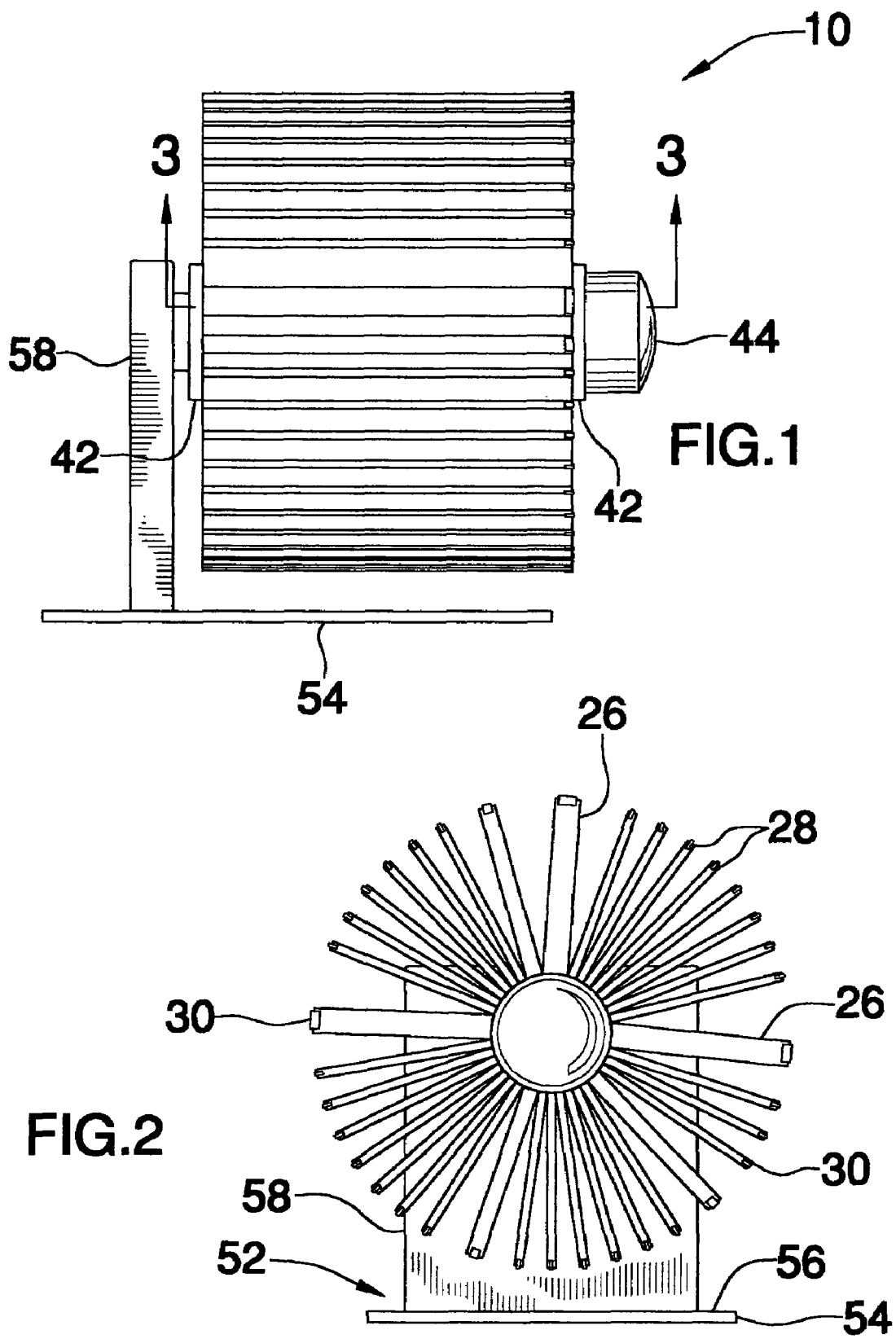

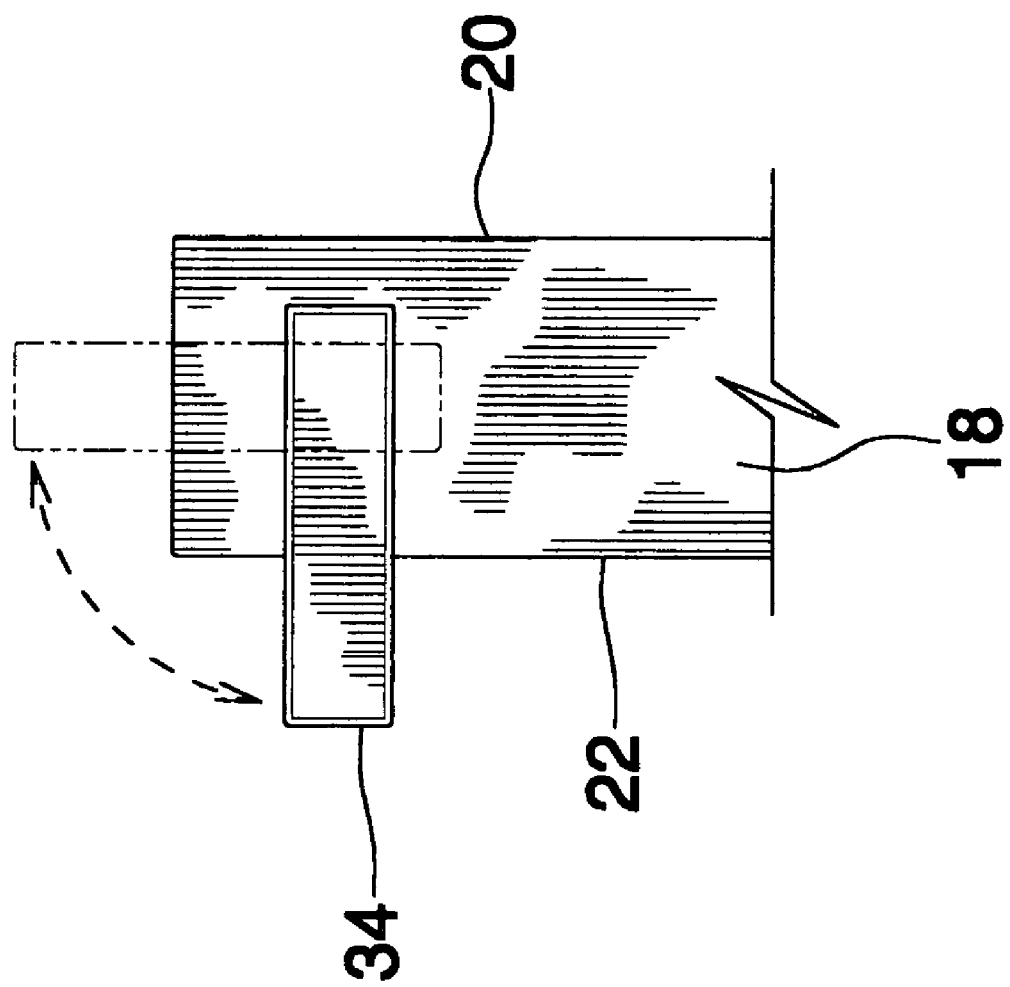

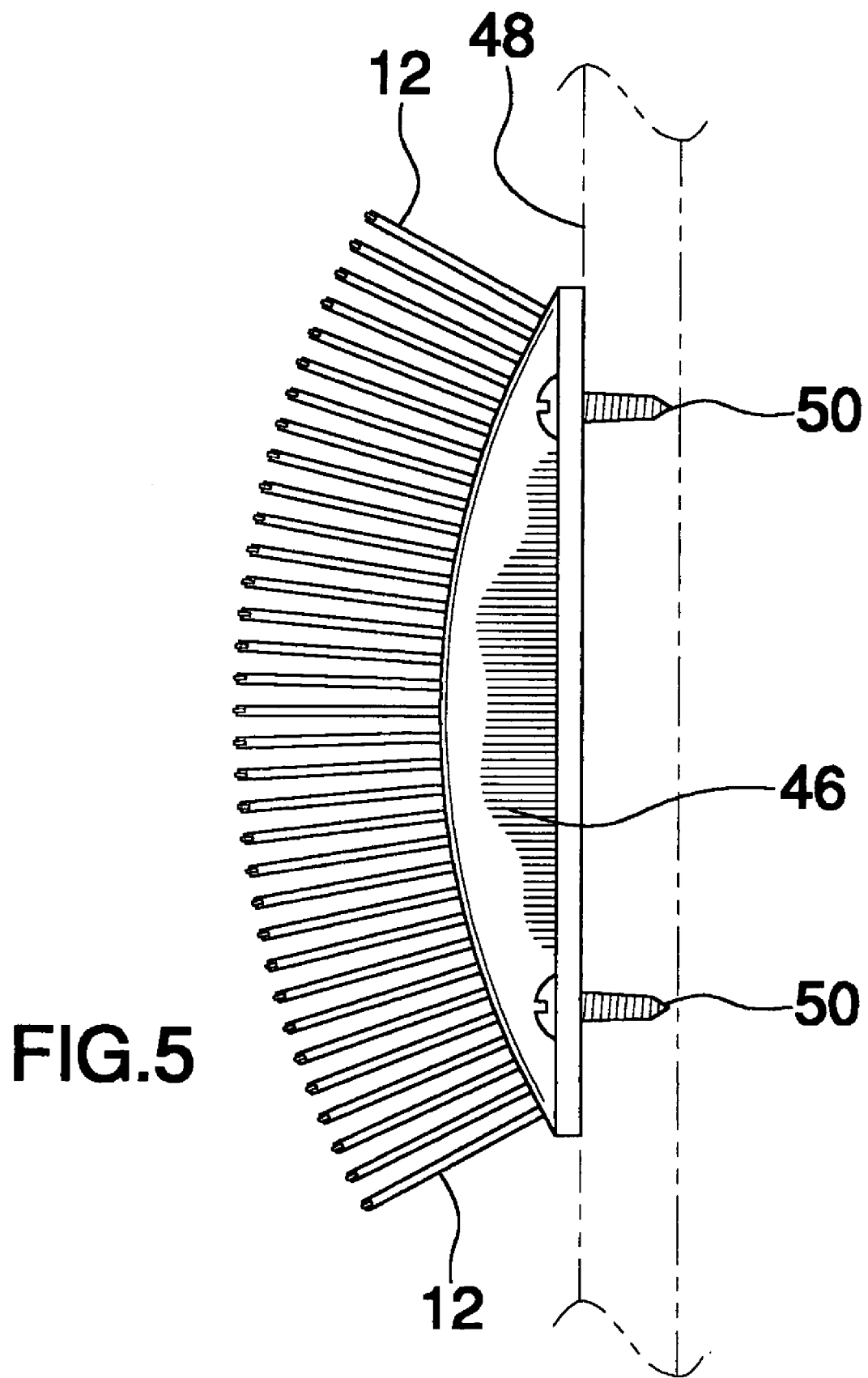

DISC CASE HOLDING APPARATUS

BACKGROUND OF THE INVENTION

1. Field of the Invention

The present invention relates to disc storage and organizing devices and more particularly pertains to a new disc storage and organizing device for storing a plurality of disc cases which contain compact discs and digital video disks.

2. Description of the Prior Art

The use of disc storage and organizing devices is known in the prior art. U.S. Pat. No. 5,307,926 describes a device for holding a plurality of compact discs within flexible sleeves. Another type of disc storage and organizing device is U.S. Pat. No. 5,176,264 which includes a structure having a plurality of slots therein for receiving and storing compact disc cases. Yet another type of disc storage device is U.S. Pat. No. 5,715,937 which provides flexible sleeve members adapted for receiving individual compact discs.

While these devices fulfill their respective, particular objectives and requirements, the need remains for a device that stores a plurality of compact discs and/or digital video discs while they are positioned within their cases. Such a device should include a pin wheel type construction holding a plurality of rigid houses which allows for easy viewing of the cases. The housings should include securing members that are adapted for preventing the cases from inadvertently falling from the housings.

SUMMARY OF THE INVENTION

The present invention meets the needs presented above by generally comprising a plurality of housings. Each of the housings has a bottom wall and a peripheral wall that is attached to and extends upwardly away from the bottom wall such that a pair of lateral sides, a front side and a back side are defined. An upper edge of the peripheral wall defines an opening extending into the housing. Each of the lateral sides has a width from the front side to the back side less than 1 inch. Each of a plurality of securing members is attached to one of the housings for selectively extending over the opening and securing a disc case within the housing. A base has an outer surface. A plurality of couplers is mounted on the base. Each of the couplers is attached to one of the bottom walls such that each of the bottom walls is pivotally attached to the base.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front view of a disc case holding apparatus according to the present invention.

FIG. 2 is a schematic right side view of the present invention.

FIG. 4 is a schematic side view of the securing member of the present invention.

FIG. 5 is a schematic side view of a second embodiment of the present invention.

DESCRIPTION OF THE PREFERRED EMBODIMENT

Figure 3:
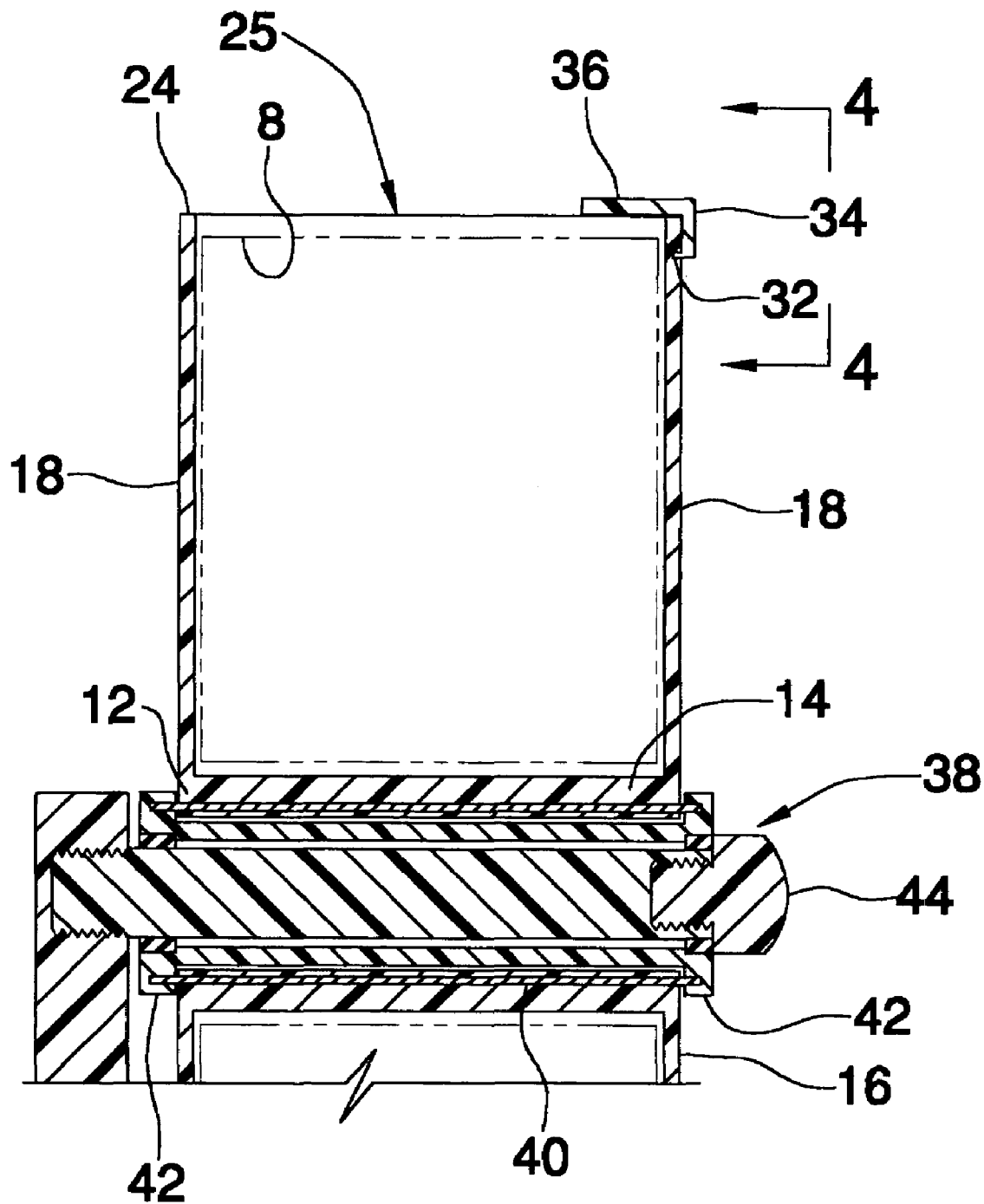
FIG. 3 is a schematic cross-sectional view taken along line 3—3 of FIG. 1 of the present invention.

With reference now to the drawings, and in particular to FIGS. 1 through 5 thereof, a new disc storage and organizing device embodying the principles and concepts of the present invention and generally designated by the reference numeral 10 will be described.

As best illustrated in FIGS. 1 through 5, the disc case holding apparatus 10 generally comprises a plurality of housings 12. Each of the housings 12 has a bottom wall 14 and a peripheral wall 16 that is attached to and extends upwardly away from the bottom wall 14 such that a pair of lateral sides 18, a front side 20 and a back side 22 are defined. An upper edge 24 of the peripheral wall 16 defines an opening 25 extending into the housing 12. Each of the lateral sides 18 has a width from the front side 20 to the back side 22 less than 1 inch. Each of the front 20 and back sides 22 has a length between the lateral sides 18 generally between 5 inches and 6 inches and each of the front 20 and back 22 sides has a height greater than 5 inches. Preferably, the plurality of housings 12 includes a first set 26 of housings 12 and a second set 28 of housings 12 wherein the first set 26 of housings has a distance between the front 20 and back 22 sides greater than ½ inch and the second set 28 of housings has a distance between the front 20 and back 22 sides between ¼ inch and ½ inch. This allows for variations in disc case size to accommodate both compact disc and digital video disc cases 8. The housings 12 are preferably transparent for easy viewing of the contents thereof and constructed of a rigid plastic.

A plurality of securing members 30 is provided. Each of the securing members 30 is attached to one of the housings 12 for selectively securing a disc case 8 within the housing. Each of the securing members 30 includes a rod 32 that extends into and is pivotally attached to a first of the lateral sides 18. The rod 32 is positioned adjacent to an associated one of the openings 25. A first arm 34 is attached to a second arm 36 at a substantially perpendicular angle. The first arm 34 is attached to the rod 32 such that the second arm 36 may be selectively positioned over and adjacent to the opening 25. When positioned over the opening 25, the second arm 36 prevents a disc case 8 positioned within the housing 12 from falling outwardly thereof. A second securing member may be attached to the other of the lateral sides 18.

A base 38 has an outer surface. A plurality of couplers 40 is mounted on the base 38. Each of the couplers 40 is attached to one of the bottom walls 14 such that each of the bottom walls 14 is pivotally attached to the base 38. Ideally, lines orientated parallel to each of the bottom walls 14 are also orientated parallel to each other so that all of the housings 12 fan outwardly form the base 38. Preferably, the base 38 has an elongated tubular configuration and includes an outer sleeve 42 and an inner post 44. The post 44 extends through and is rotatably coupled to the outer sleeve 42. Each bottom walls 14 is attached to the outer sleeve 42 via the couplers 40 and is orientated parallel to a longitudinal axis of the inner post 44. Alternatively, the base 38 may include a convex panel 46 from which the housings 12 extend. The panel 46 may be attached to a vertical surface 48 using conventional fasteners 50.

A stand 52 is attached to an end of the post 44 such that the post 44 is supported in a horizontal orientation. The stand 52 includes a plate 54 that has a top side 56. A leg 58 is attached to and extends upwardly from the top side 56. The post 44 is attached to the leg 58 and is orientated generally perpendicular to the leg 58 such that the post 44 extends over the plate 54. Alternatively, it is envisioned that the post 44 coupled may be attached directly to the top side 56 so that the post 44 is vertically orientated.

In use, the housings 12 are used for holding, storing and organizing compact disc and digital video disc cases 8. The apparatus 10 allows for a large number of cases 8 to be stored in a relatively small amount of space and in a manner which allows convenient viewing of the cases 8.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A disc case holding assembly comprising:
a plurality of housings, each of said housings having a bottom wall and a peripheral wall being attached to and extending upwardly away from said bottom wall such that a pair of lateral sides, a front side and a back side are defined, an upper edge of said peripheral wall defining an opening extending into said housing, each of said lateral sides having a width from said front side to said back side less than 1 inch, each of said front and back sides having a length between said lateral sides generally between 5 inches and 6 inches, each of said front and back sides having a height greater than 5 inches, said plurality of housings includes a first set of housings and a second set of housings, said first set of housings having a distance between said front and back sides greater than ½ inch, said second set of housings having a distance between said front and back sides between ¼ inch and ½ inch, wherein each of said bottom walls has a longitudinal axis, said longitudinal axes being orientated parallel to each other;
a plurality of securing members, each of said securing members being attached to one of said housings for selectively extending over said opening and securing a disc case within said housing;
a base having an outer surface, a plurality of couplers being mounted on said base, each of said couplers being attached to one of said bottom walls such that each of said bottom walls is pivotally attached to said bas, said base having an elongated tubular configuration and includes an outer sleeve and an inner post, said post extending through and being rotatably coupled to said outer sleeve, each bottom walls being attached to said outer sleeve and being parallel to a longitudinal axis of said inner post.

2. The assembly according to claim 1, further including a stand being attached to an end of said post such that said post is supported in a horizontal orientation.

3. The assembly according to claim 2, said stand including a plate having a top side, a leg being attached to and extending upwardly from said top side, said post being attached to said leg and being orientated generally perpendicular to said leg such that said post extends over said plate.

4. The assembly according to claim 1, wherein each of said securing members includes a rod extending into and being pivotally attached to a first of said lateral sides, said rod being positioned adjacent to said opening, a first arm being attached to a second arm at a substantially perpendicular angle, said first arm being attached to said rod such that said second arm may be selectively positioned over and adjacent to said opening.

5. The assembly according to claim 4, wherein said base has an elongated tubular configuration and includes an outer sleeve and an inner post said post extending through and being rotatably coupled to said outer sleeve, each bottom walls being attached to said outer sleeve and being orientated parallel to a longitudinal axis of said inner post.

6. The assembly according to claim 5, further including a stand being attached to an end of said post such that said post is supported in a horizontal orientation.

7. The assembly according to claim 6, said stand including a plate having a top side, a leg being attached to and extending upwardly from said top side, said post being attached to said leg and being orientated generally perpendicular to said leg such that said post extends over said plate.

8. A disc case holding assembly comprising:
a plurality of housings, each of said housings having a bottom wall and a peripheral wall being attached to and extending upwardly away from said bottom wall such that a pair of lateral sides, a front side and a back side are defined, an upper edge of said peripheral wall defining an opening extending into said housing, each of said lateral sides having a width from said front side to said back side less than 1 inch, each of said front and back sides having a length between said lateral sides generally between 5 inches and 6 inches, each of said front and back sides having a height greater than 5 inches, said plurality of housings includes a first set of housings and a second set of housings, said first set of housings having a distance between said front and back sides greater than ½ inch, said second set of housings having a distance between said front and back sides between ¼ inch and ½ inch;
a plurality of securing members, each of said securing members being attached to one of said housings for selectively securing a disc case within said housing, each of said securing members including;
a rod extending into and being pivotally attached to a first of said lateral sides, said rod being positioned adjacent to said opening;
a first arm being attached to a second arm at a substantially perpendicular angle, said first arm being attached to said rod such that said second arm may be selectively positioned over and adjacent to said opening;
a base having an outer surface, a plurality of couplers being mounted on said base, each of said couplers being attached to one of said bottom walls such that each of said bottom walls is pivotally attached to said base, wherein lines orientated parallel to each of said bottom walls are orientated parallel to each other, said base having an elongated tubular configuration and including an outer sleeve and an inner post, said post extending through and being rotatably coupled to said outer sleeve, each bottom walls being attached to said outer sleeve and being orientated parallel to a longitudinal axis of said inner post; and a stand being attached to an end of said post such that said post is supported in a horizontal orientation, said stand including a plate having a top side, a leg being attached to and extending upwardly from said top side, said post being attached to said leg and being orientated generally perpendicular to said leg such that said post extends over said plate.

9. A disc case holding assembly comprising:

a plurality of housings, each of said housings having a bottom wall and a peripheral wall being attached to and extending upwardly away from said bottom wall such that a pair of lateral sides, a front side and a back side are defined, an upper edge of said peripheral wall defining an opening extending into said housing, each of said lateral sides having a width from said front side to said back side less than 1 inch;

a plurality of securing members, each of said securing members being attached to one of said housings for selectively extending over said opening and securing a disc case within said housing, each of said securing members including a rod extending into and being pivotally attached to a first of said lateral sides, said rod being positioned adjacent to said opening, a first arm being attached to a second arm at a substantially perpendicular angle, said first arm being attached to said rod such that said second arm may be selectively positioned over and adjacent to said opening;

a base having an outer surface, a plurality of couplers being mounted on said base, each of said couplers being attached to one of said bottom walls such that each of said bottom walls is pivotally attached to said base.

10. The assembly according to claim 9, wherein each of said front and back sides has a length between said lateral sides generally between 5 inches and 6 inches, each of said front and back sides having a height greater than 5 inches.

11. The assembly according to claim 10, wherein said plurality of housings includes a first set of housings and a second set of housings, said first set of housings having a distance between said front and back sides greater than ½ inch, said second set of housings having a distance between said front and back sides between ¼ inch and ½ inch.

12. The assembly according to claim 9, wherein each of said bottom walls has a longitudinal axis, said longitudinal axes being orientated parallel to each other.

13. The assembly according to claim 9, wherein said base has an elongated tubular configuration and includes an outer sleeve and an inner post, said post extending through and being rotatably coupled to said outer sleeve, each bottom walls being attached to said outer sleeve and being orientated parallel to a longitudinal axis of said inner post.

14. The assembly according to claim 13, further including a stand being attached to an end of said post such that said post is supported in a horizontal orientation.

15. The assembly according to claim 14, said stand including a plate having a top side, a leg being attached to and extending upwardly from said top side, said post being attached to said leg and being orientated generally perpendicular to said leg such that said post extends over said plate.

* * * * *